(12) United States Patent
Pito

(10) Patent No.: US 11,763,079 B2
(45) Date of Patent: Sep. 19, 2023

(54) SYSTEMS AND METHODS FOR STRUCTURE AND HEADER EXTRACTION

(71) Applicant: Thomson Reuters Enterprise Centre GmbH, Zug (CH)

(72) Inventor: Richard Anthony Pito, Toronto (CA)

(73) Assignee: THOMSON REUTERS ENTERPRISE CENTRE GMBH, Zug (CH)

( * ) Notice: Subject to any disclaimer, the term of this patent is extended or adjusted under 35 U.S.C. 154(b) by 0 days.

(21) Appl. No.: 17/156,546

(22) Filed: Jan. 23, 2021

(65) Prior Publication Data

US 2021/0319177 A1  Oct. 14, 2021

Related U.S. Application Data

(60) Provisional application No. 62/975,514, filed on Feb. 12, 2020, provisional application No. 62/965,516, filed on Jan. 24, 2020, provisional application No. 62/965,523, filed on Jan. 24, 2020, provisional application No. 62/965,520, filed on Jan. 24, 2020.

(51) Int. Cl.
| | |
|---|---|
| *G06F 40/279* | (2020.01) |
| *G06F 40/242* | (2020.01) |
| *G06F 3/0481* | (2022.01) |
| *G06F 40/166* | (2020.01) |
| *G06F 40/289* | (2020.01) |
| *G06F 40/258* | (2020.01) |
| *G06F 40/284* | (2020.01) |
| *G06F 40/109* | (2020.01) |
| *G06F 40/137* | (2020.01) |

(Continued)

(52) U.S. Cl.
CPC .......... *G06F 40/279* (2020.01); *G06F 3/0481* (2013.01); *G06F 40/109* (2020.01); *G06F 40/137* (2020.01); *G06F 40/166* (2020.01); *G06F 40/232* (2020.01); *G06F 40/242* (2020.01); *G06F 40/258* (2020.01); *G06F 40/284* (2020.01); *G06F 40/289* (2020.01); *G06V 30/416* (2022.01)

(58) Field of Classification Search
CPC .... G06F 40/258; G06F 40/279; G06F 40/242; G06F 40/166; G06F 40/289; G06F 40/284; G06F 40/109; G06F 40/137; G06F 40/232; G06F 3/0481; G06V 30/416
See application file for complete search history.

(56) References Cited

U.S. PATENT DOCUMENTS

| | | | |
|---|---|---|---|
| 6,298,357 B1 | 10/2001 | Wexler | |
| 7,672,022 B1 * | 3/2010 | Fan | G06T 5/20 358/474 |

(Continued)

OTHER PUBLICATIONS

Cai et al., "VIPS: a Vision-based Page Segmentation Algorithm," Nov. 1, 2003, pp. 1-29. (Year: 2003).*

(Continued)

*Primary Examiner* — Kyle R Stork
(74) *Attorney, Agent, or Firm* — Alston & Bird LLP

(57) ABSTRACT

The present disclosure is directed towards systems and methods for extracting structure and headers from a body of text. This computational extraction is based on the visual and logical similarities between portions of text. Structure is derived from a programmatic and methodic computation of similarities between header pairs.

20 Claims, 9 Drawing Sheets

(51) Int. Cl.
*G06F 40/232* (2020.01)
*G06V 30/416* (2022.01)

(56) References Cited

U.S. PATENT DOCUMENTS

| | | | |
|---|---|---|---|
| 7,797,622 | B2 | 9/2010 | Dejean |
| 7,937,653 | B2 | 5/2011 | Dejean |
| 8,631,097 | B1 | 1/2014 | Seo |
| 8,898,296 | B2 | 11/2014 | Zeng |
| 8,914,720 | B2 | 12/2014 | Harrington |
| 9,218,326 | B2 | 12/2015 | Dejean |
| 9,336,202 | B2 | 5/2016 | Khan |
| 9,483,463 | B2 | 11/2016 | Galle et al. |
| 9,514,499 | B1 | 12/2016 | Kogut-O'Connell et al. |
| 10,019,488 | B2 | 7/2018 | Levy |
| 10,049,270 | B1* | 8/2018 | Agarwalla ............ G06V 30/413 |
| 10,318,568 | B2 | 6/2019 | Yasue |
| 10,460,162 | B2 | 10/2019 | Gelosi |
| 10,614,113 | B2 | 4/2020 | Peled |
| 10,726,198 | B2 | 7/2020 | Gelosi |
| 10,878,195 | B2 | 12/2020 | Duta |
| 10,885,282 | B2 | 1/2021 | Ilic |
| 11,023,675 | B1 | 6/2021 | Neervannan |
| 11,170,759 | B2 | 11/2021 | Sim |
| 11,205,043 | B1 | 12/2021 | Neervannan |
| 11,205,044 | B1 | 12/2021 | Neervannan |
| 11,256,856 | B2 | 2/2022 | Gelosi |
| 11,475,209 | B2 | 10/2022 | Gelosi |
| 2004/0049462 | A1 | 3/2004 | Wang |
| 2004/0162827 | A1 | 8/2004 | Nakano |
| 2006/0156226 | A1 | 7/2006 | Dejean |
| 2008/0114757 | A1 | 5/2008 | Dejean |
| 2011/0029952 | A1 | 2/2011 | Harrington |
| 2011/0055206 | A1 | 3/2011 | Martin et al. |
| 2011/0075932 | A1 | 3/2011 | Komaki |
| 2011/0145701 | A1 | 6/2011 | Dejean |
| 2011/0197121 | A1 | 8/2011 | Kletter |
| 2011/0216975 | A1* | 9/2011 | Rother ................ G06T 17/00 382/173 |
| 2012/0278321 | A1* | 11/2012 | Traub ................ G06F 16/3331 707/E17.014 |
| 2012/0297025 | A1 | 11/2012 | Zeng |
| 2013/0174029 | A1 | 7/2013 | O'Sullivan et al. |
| 2013/0191366 | A1 | 7/2013 | Jovanovic |
| 2013/0311169 | A1 | 11/2013 | Khan |
| 2014/0074455 | A1 | 3/2014 | Galle et al. |
| 2014/0101456 | A1 | 4/2014 | Meunier et al. |
| 2014/0337719 | A1* | 11/2014 | Xu ................ G06F 3/0484 715/255 |
| 2015/0067476 | A1 | 3/2015 | Song |
| 2015/0100308 | A1 | 4/2015 | Bedrax-Weiss et al. |
| 2015/0161102 | A1 | 6/2015 | Gidney |
| 2015/0169676 | A1 | 6/2015 | Bohra |
| 2016/0048520 | A1 | 2/2016 | Levy |
| 2016/0224662 | A1 | 8/2016 | King et al. |
| 2017/0011313 | A1 | 1/2017 | Pochert et al. |
| 2017/0017641 | A1 | 1/2017 | Gidney |
| 2017/0052934 | A1 | 2/2017 | Hatsutori |
| 2017/0103466 | A1 | 4/2017 | Syed |
| 2017/0329846 | A1 | 11/2017 | Dole |
| 2017/0351688 | A1 | 12/2017 | Yasue |
| 2018/0039907 | A1* | 2/2018 | Kraley ................ G06K 9/4628 |
| 2018/0096060 | A1 | 4/2018 | Peled |
| 2018/0260378 | A1 | 9/2018 | Theodore et al. |
| 2018/0268506 | A1 | 9/2018 | Wodetzki et al. |
| 2018/0300315 | A1 | 10/2018 | Leal |
| 2019/0114479 | A1 | 4/2019 | Gelosi |
| 2019/0155944 | A1 | 5/2019 | Mahata et al. |
| 2019/0220503 | A1 | 7/2019 | Gelosi |
| 2019/0272421 | A1 | 9/2019 | Sugaya |
| 2019/0278853 | A1 | 9/2019 | Chen |
| 2019/0340240 | A1 | 11/2019 | Duta |
| 2019/0347284 | A1 | 11/2019 | Roman et al. |
| 2020/0026916 | A1 | 1/2020 | Wood et al. |
| 2020/0043113 | A1 | 2/2020 | DePalma et al. |
| 2020/0097759 | A1 | 3/2020 | Nadim |
| 2020/0104957 | A1 | 4/2020 | Guo et al. |
| 2020/0110800 | A1 | 4/2020 | Astigarraga et al. |
| 2020/0184013 | A1 | 6/2020 | Ilic |
| 2020/0219481 | A1 | 7/2020 | Sim |
| 2020/0226510 | A1 | 7/2020 | Gupta |
| 2020/0311412 | A1 | 10/2020 | Prebble |
| 2020/0327151 | A1 | 10/2020 | Coquard et al. |
| 2020/0349199 | A1 | 11/2020 | Jayaraman |
| 2020/0364291 | A1 | 11/2020 | Bentabet |
| 2021/0117667 | A1 | 4/2021 | Mehra |
| 2021/0150128 | A1 | 5/2021 | Gelosi |
| 2021/0201013 | A1 | 7/2021 | Makhija et al. |
| 2022/0277140 | A1 | 9/2022 | Rhim |

OTHER PUBLICATIONS

Pomikalek, Jan, "Removing Boilerplate and Duplicate Content from Web Corpora." 108 pages, (2011), https://is.muni.cz/th/45523/fi_d/phdthesis.pdf.

* cited by examiner

INTRODUCTION
  Section 1. ...
  a: ...
  ...
  e: ...
  l: ...         } OE: 'l' instead of 'I'
  h: ...
  i: ...
  ii: ...        } FE: sub-list indent is lost
  iii: ...
  i: ...         } SIE: "Section 2" not identified
  Section 3. ... } FE: left indent is incorrect
  SIGNATURE      } SIE: Invalid section header identified
       SUMMARY   } UE: user didn't underline heading to match "INTRODUCTION"

Figure 1(a)

1  INTRODUCTION
2  -- Section 1.
3  ---- a.
4  ---- ...
5  ---- e.
6  ---- l.
7  ---- h.
8  ------ i.
9  ------ ii.
10 ------ iii.
11 ---- i.
12 -- Section 3.
13 SUMMARY

Figure 1(b)

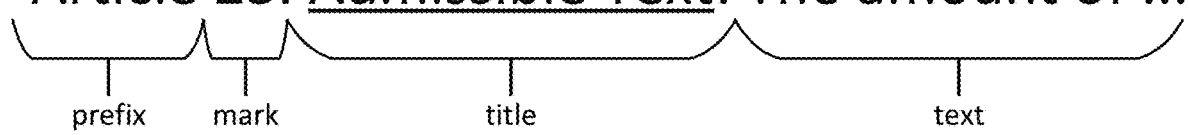
Figure 2: Heading form.
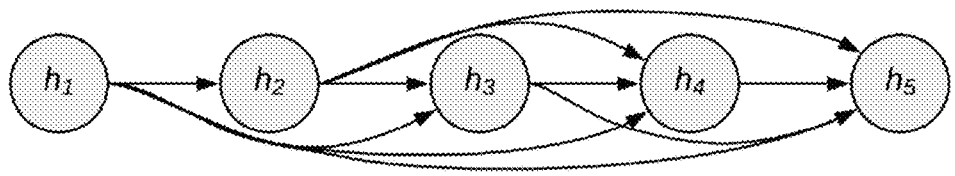
Figure 3(a)
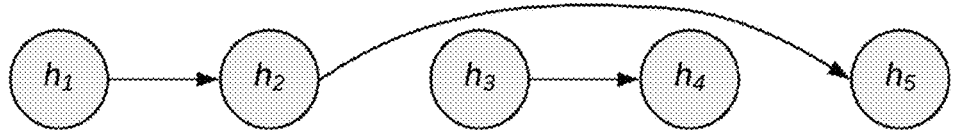
Figure 3(b)

```
Function rec_edge(parent, depth, edge, P):
    edge.[head,tail].parent ← parent;
    edge.[head,tail].depth ← depth;
    P_edge ← sequences that edge covers in P;
    foreach sequence ∈ P_edge do
        foreach child_edge ∈ sequence do
            rec_edge (edge.head, depth + 1, child_edge, P);
        end
    end
```

SYSTEMS AND METHODS FOR STRUCTURE AND HEADER EXTRACTION

CROSS-REFERENCE TO RELATED APPLICATIONS

This application claims the benefit of and priority to U.S. Provisional Application Nos. 62/965,516, filed Jan. 24, 2020; 62/965,520, filed Jan. 24, 2020; 62/965,523, filed Jan. 24, 2020; and 62/975,514, filed Feb. 12, 2020, which are hereby incorporated by reference in their entireties.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

BACKGROUND

The present innovations generally address tools for extracting structure and header information from documents. Large professional documents such as those found in the legal domain are normally hierarchically structured into sections which contain sub-sections which further contain sub-sub-sections and so on. In addition, each of these sections may contain lists, with sub-lists, etc. This structure can convey important information when analyzing a document for many downstream tasks such as information retrieval, information extraction, document presentation and/or document navigation.

Using a computer to reliably extract a document's structure for real world documents is challenging not only because many documents don't follow a consistent template but also because of errors introduced by document conversion and user error. Furthermore, the structure of a document can be obscured by boilerplate text such as page headers and footers that are captured during an optical character recognition ("OCR") process and must be reliably identified and removed.

The existing literature about document structure analysis can be roughly divided into the identification of physical, logical and/or semantic structure. See Dengel and Shafait (Andreas Dengel and Faisal Shafait. [n.d.]. Analysis of the Logical Layout of Documents. In *Handbook of Document Image Processing and Recognition*, David Doermann and Karl Tombre (Eds.). Springer London, 177-222.) and Mao et. al (Song Mao, Azriel Rosenfeld, and Tapas Kanungo. [n.d.]. Document structure analysis algorithms: a literature survey, Tapas Kanungo, Elisa H. Barney Smith, Jianying Hu, and Paul B. Kantor (Eds.). 197-207.) for reviews, both of which are incorporated herein in their entireties. Physical structure extraction deals with capturing a digital representation of a paper document and involves image processing/enhancement, grouping the pixels of an image of a document into sections, identifying the type of each section (e.g. text or image) and performing OCR on text sections. Logical structure analysis involves identifying relationships between physical components, e.g. the caption of a figure, the agglomeration of coherent sections of text, the document's reading order and possibly its section hierarchy. Logical structure analysis may be performed on natively digital documents where structure information is not readily available as in PDF documents. Semantic analysis normally involves identifying section types specific to a certain domain although this is sometimes grouped under logical structure analysis. These processes are generally applied sequentially and errors in one process can accumulate in downstream processes.

The present inventions may fall into the domain of logical structure analysis and take as input text blocks in reading order that are annotated with layout and formatting information and produces a hierarchy of sections and/or list items in the form of a tree. The present inventions deal, therefore, not only with scanned documents but natively electronic documents that do not have structure annotations.

Tuarob et. al. (S. Tuarob, P. Mitra, and C. L. Giles. [n.d.]. A hybrid approach to discover semantic hierarchical sections in scholarly documents. In 2015 *13th International Conference on Document Analysis and Recognition (ICDAR)* (2015-08). 1081-1085.) identify and classify sections and creates a hierarchy using domain specific rules for scholarly articles. Constantin et. al. (Alexandru Constantin, Steve Pettifer, and *Andrei* Voronkov. [n.d.]. PDFX: fully-automated PDF-to-XML conversion of scientific literature. ACM Press, 177.) identify the logical parts of scientific documents using rules based on some font characteristics. While both of these use font characteristics to identify section headings and/or boundaries, neither is completely sufficient. Rahman and Finin (Muhammad Mahbubur Rahman and Tim Finin. [n.d.]. Understanding the Logical and Semantic Structure of Large Documents. ([n. d.]). arXiv: 1709.00770) also work in the domain of scholarly articles, however they only identify structure as a byproduct of identifying a constrained number of section headings using an ML approach. All of these approaches only derive structure to a limited depth. Finally, Rausch et. al. (Johannes Rausch, Octavio Martinez, Fabian Bissig, Ce Zhang, and Stefan Feuer-riegel. [n.d.]. DocParser: Hierarchical Structure Parsing of Document Renderings. ([n. d.]). arXiv: 1911.01702) derive a logical hierarchy using rules which rely on the relationship between bounding boxes of elements extracted from a document rendering, but this is still insufficient. Each of these references are incorporated by reference herein in their entireties.

The present inventions differ from these in many ways, but at least in that we propose a system based on optimizing a global measure of the internal coherence of a document's structure as opposed to domain specific rules that are applied locally or machine learned models that identify section headings in isolation.

Accordingly, the present inventions address the need for improvements in computer functionality to extract structure and header information from digital documents.

In order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BRIEF SUMMARY

The present invention provides a system and method for structure and/or header extraction.

In one aspect, a method for extracting headers comprises receiving an input body of text containing a plurality of chunks of text, identifying a set of features of each chunk, classifying each text chunk as a potential header depending on whether the chunk includes a mark or title text, identifying any boilerplate in each potential header and removing it to form cleaned potential headers, and comparing the cleaned potential headers to each other and to a remainder of the input body of text not included in the cleaned potential headers to confirm whether each cleaned potential header is a header.

In one example, the features include typography characteristics. For example, the features may include at least two or more of font family, font size, italic, bold, underline, space above, space left, space left first line, and justification.

In another example, the features include orthography characteristics.

In another example, the features include page layout.

In another example, the features include at least two or more of typography characteristics, orthography characteristics and page layout.

In another example, the method further comprises determining if a chunk includes title text by at least comparing features of the chunk to features of a remainder of the input body of text and identifying title text if its features differ from those of a majority of the remainder.

In another example, the comparison of cleaned headers includes comparing the number of characters included in the cleaned potential headers and chunks of text in the input body of text covered by the cleaned potential headers to a total number of characters in the input body of text.

In another example, the comparison of cleaned potential headers includes determining a similarity among all of the cleaned potential headers based on their features.

In another example, the comparison of cleaned potential headers includes discounting groups of similar cleaned potential headers based on an average number of characters among the cleaned potential headers.

In another example, identifying boilerplate includes comparing an average number of characters in a group of potential headers with similar features to a threshold.

In another example, identifying boilerplate includes comparing an average number of characters in a group of potential headers with similar features to a number of character edits required to transform each potential header in the group into a subsequent potential header in the group.

In another example, identifying boilerplate includes comparing an average number of characters in a group of potential headers with similar features to a threshold and to a number of character edits required to transform each potential header in the group into a subsequent potential header in the group.

In another example, identifying boilerplate includes comparing potential headers to a set of one or more predetermined non-boilerplate words.

In another aspect, a method for extracting structure among headers comprises receiving a plurality of headers in reading order as they appear in a document, identifying a set of features for each header, determining a similarity between all pairs of headers based on their features, segmenting the headers into groups of one or more similar adjacent headers based on similarities between adjacent headers in the reading order, and matching non-adjacent groups of similar adjacent headers based on feature similarities between headers of the groups.

In one example, the matching of non-adjacent groups of similar adjacent headers is based on similarities between last headers in one group and first headers in another group.

In another example, the headers are segmented into groups of one or more similar adjacent headers based on zero crossings of a second derivative of adjacent heading similarities along the reading order. In one example, the adjacent heading similarities are smoothed before the second derivative is performed. For example, the smoothing may include convolution with a smoothing kernel.

In another example, the method further comprises cutting any headers that cross one another, resulting in only non-crossing headers.

In another example, the matched non-adjacent groups of similar adjacent headers form sequences and the matching includes maximizing a document-wide sum of similarities between adjacent headers within each sequence.

In another example, the features include typography characteristics.

In another example, the features include at least two or more of font family, font size, italic, bold, underline, space above, space left, space left first line, and justification.

In another example, the features include orthography characteristics.

In another example, the features include page layout.

In another example, determining a similarity between pairs of headers includes comparing marks of the headers.

In another example, determining a similarity between pairs of headers includes determining whether marks of the headers are derived from a same template.

In another example, determining a similarity between pairs of headers includes determining whether marks of the headers are in sequence from the header that is first in reading order to the header that is later in reading order.

In another aspect, a method for extracting structure among headers, comprising receiving a plurality of headers in reading order as they appear in a document, identifying a set of features for each header, determining a similarity between all pairs of headers based on their features, and sequencing the headers into one or more sequences by maximizing a document-wide sum of similarities between adjacent headers within each sequence.

In another example, the features include typography characteristics.

In another example, the features include orthography characteristics.

In another example, the features include page layout.

In another example, determining a similarity between pairs of headers includes determining whether marks of the headers are derived from a same template.

In another example, determining a similarity between pairs of headers includes determining whether marks of the headers are in sequence from the header that is first in reading order to the header that is later in reading order.

BRIEF DESCRIPTION OF THE DRAWINGS

The accompanying drawings illustrate various non-limiting, example, innovative aspects in accordance with the present descriptions:

FIG. 1(a) shows a sequence of headings with four kinds of errors highlighted: OE are OCR errors, FE are format errors, SIE are section identification errors and UE are user errors.

FIG. 1(b) shows the correct hierarchical structure of the sequence shown in FIG. 1(a).

FIG. 2 depicts the form a header or title.

FIG. 3(a) depicts a problem graph for a document with five headings.

FIG. 3(b) depicts a partition graph of the graph shown in FIG. 3(a) into two paths/sequences.

FIG. 10 depicts the second page of an exemplary document to be analyzed according to the present innovations.

FIG. 11 depicts another page of an exemplary document to be analyzed according to the present innovations.

DETAILED DESCRIPTION

Figure 4A:
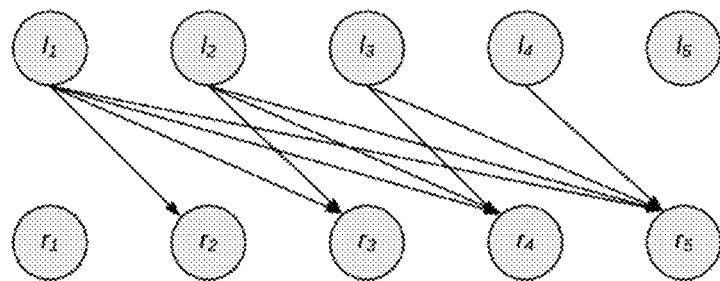
FIG. 4(a) depicts the bipartite representation of the problem graph shown in FIG. 3(a).

Embodiments of systems and methods for extracting structure and header information from documents are described herein. While aspects of the described systems and methods can be implemented in any number of different configurations, the embodiments are described in the context of the following exemplary configurations. The descriptions and details of well-known components and structures are omitted for simplicity of the description, but would be readily familiar to those having ordinary skill in the art.

The description and figures merely illustrate exemplary embodiments of the inventive systems and methods. It will thus be appreciated that those skilled in the art will be able to devise various arrangements that, although not explicitly described or shown herein, embody the principles of the present subject matter. Furthermore, all examples recited herein are intended to be for illustrative purposes only to aid the reader in understanding the principles of the present subject matter and the concepts contributed by the inventors to furthering the art, and are to be construed as being without limitation to such specifically recited examples and conditions. Moreover, all statements herein reciting principles, aspects, and embodiments of the present subject matter, as well as specific examples thereof, are intended to encompass all equivalents thereof.

In general, the systems and methods described herein may relate to improvements to aspects of using computers to extract structure and header information from documents. These improvements not only improve the functioning of how such a computer (or any number of computers employed in extracting structure and header information from documents) is able to operate to serve the user's document analysis goals, but also improves the accuracy, efficiency and usefulness of the structure and heading extraction results that are returned to the user.

The tools described herein are particularly suited to legal documents and are generally discussed in that context, however it will be appreciated that many other types of documents, texts and users will benefit from the inventive tools disclosed and claimed herein.

Large professional documents such as those found in the legal domain are normally hierarchically structured into sections which contain sub-sections which further contain sub-sub-sections and so on. In addition, each of these sections may contain lists, with sub-lists, etc. This hierarchical structure (or just hierarchy) contains important information the author intended to convey to the reader and properly extracting it can aid many downstream tasks such as information retrieval, information extraction, document presentation and/or document navigation. Furthermore, if a document is created by an OCR scanning process the text of any headers, footers, and/or page numbers or other "boilerplate" must be identified and removed.

Many real-world documents, however, are corrupted by many kinds of errors or "noise". Errors in a document's text, format and/or layout can be introduced during transformation from one form to another, e.g. OCR scanning or rendering of web content, and by user error. Furthermore, the well-known difficulty in accurately identifying boilerplate and section boundaries introduces additional noise when attempting to reconstruct a document's hierarchy if not done well.

Many of the documents to which the present innovations are particularly relevant do not adhere to any specific formatting style and can vary between geographies, domains, organizations, and even individuals. Because of this balkanization it is difficult to create template-based or machine learned models that can generalize well not only because of the cost of acquiring training data but because it is expected that previously unseen document styles will be routinely observed at runtime.

Figure 9:
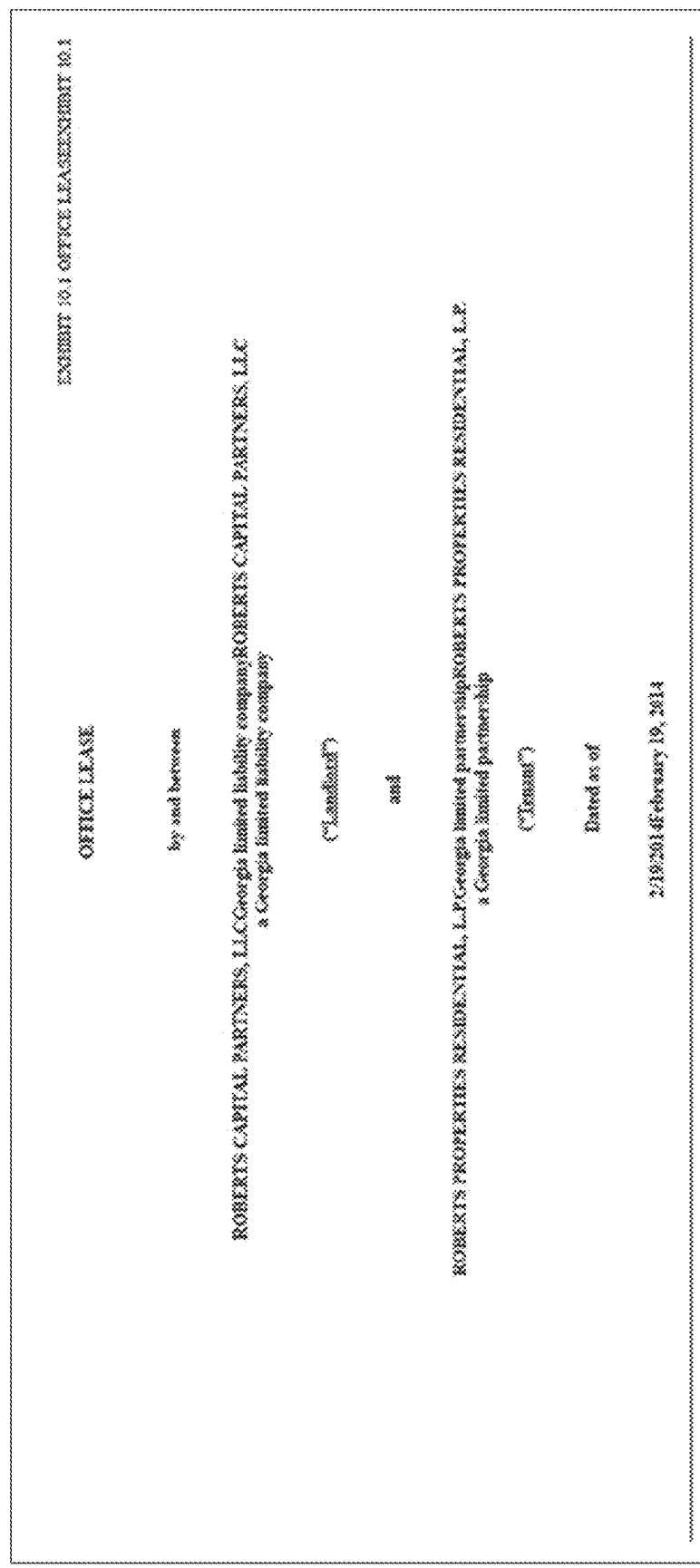
FIG. 9 depicts the first page of an exemplary document to be analyzed according to the present innovations.

As one example, shown in FIG. 9, the first page of an exemplary document includes boilerplate that must be identified and not confused as a clause title (also referred to interchangeably herein as a "heading"). For example, since "OFFICE LEASE" is all caps and centered should it be considered as a clause title and so begin a clause? What should we do with "EXHIBIT 10.1 OFFICE LEASEEXHIBIT 10.1" in the upper right corner? As another example, if the text of a document reads "Tenant shall not DC&H LLC page 3. sublease . . . " this should be cleaned of boilerplate with the result being "Tenant shall not sublease . . . ".

Figure 10:
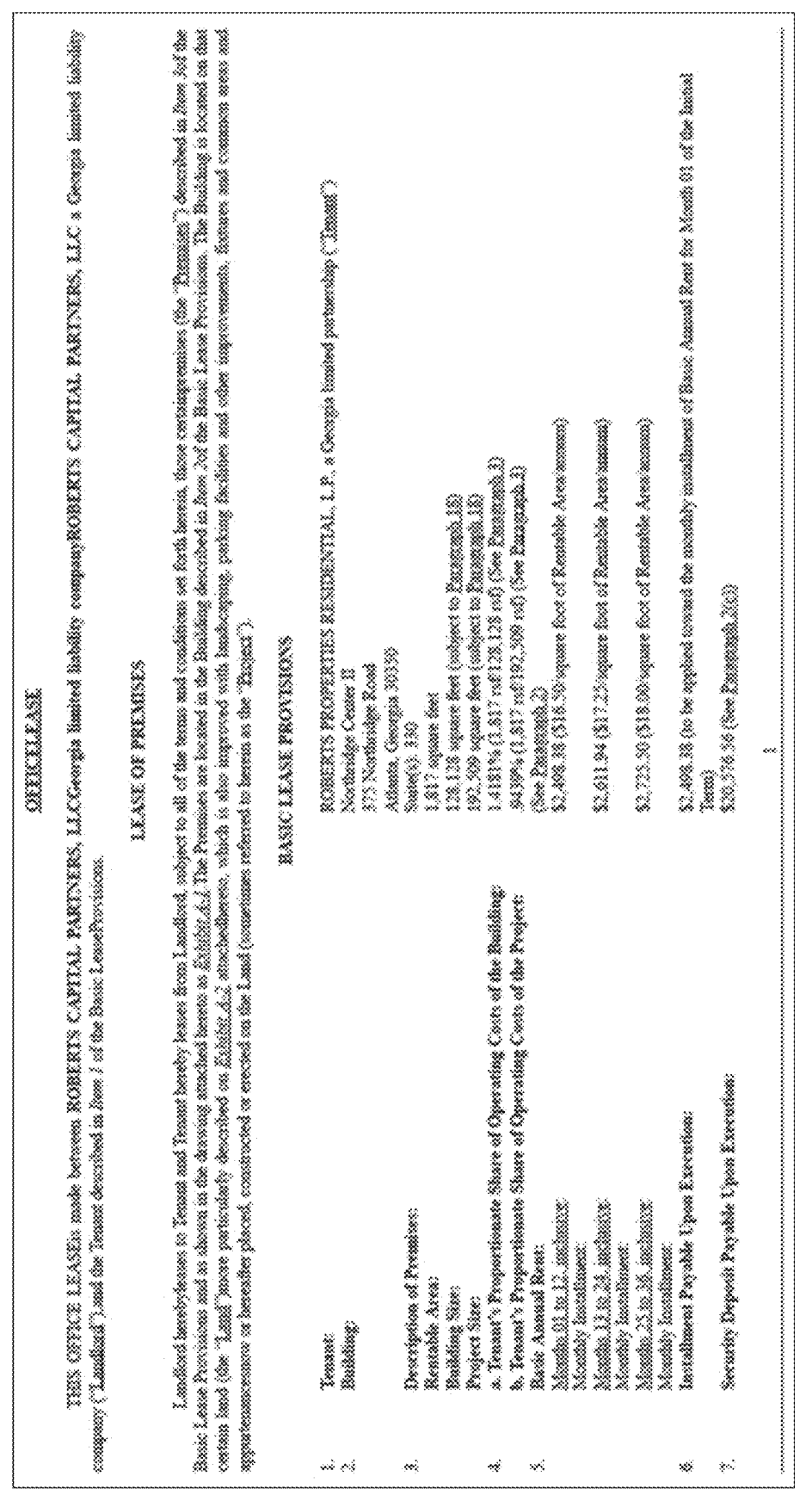

In another example, on the second page of an exemplary document, shown in FIG. 10, there begins to be a sort of structure with "OFFICELEASE" beginning a section that contains the subsections "LEASE OF PREMISES" and "BASIC LEASE PROVISIONS". Are these clauses? It probably depends on what the rest of the document looks like. There is also a table which can be very difficult to parse properly, especially since there are numbered items involved. For example, a linear scan of the text in the table will miss the two-dimensional structure needed to properly interpret the text. We also see the introduction of a page number at the bottom of the page which is text that should not be included in the body of a clause and should be considered as a type of boilerplate.

Figure 11:
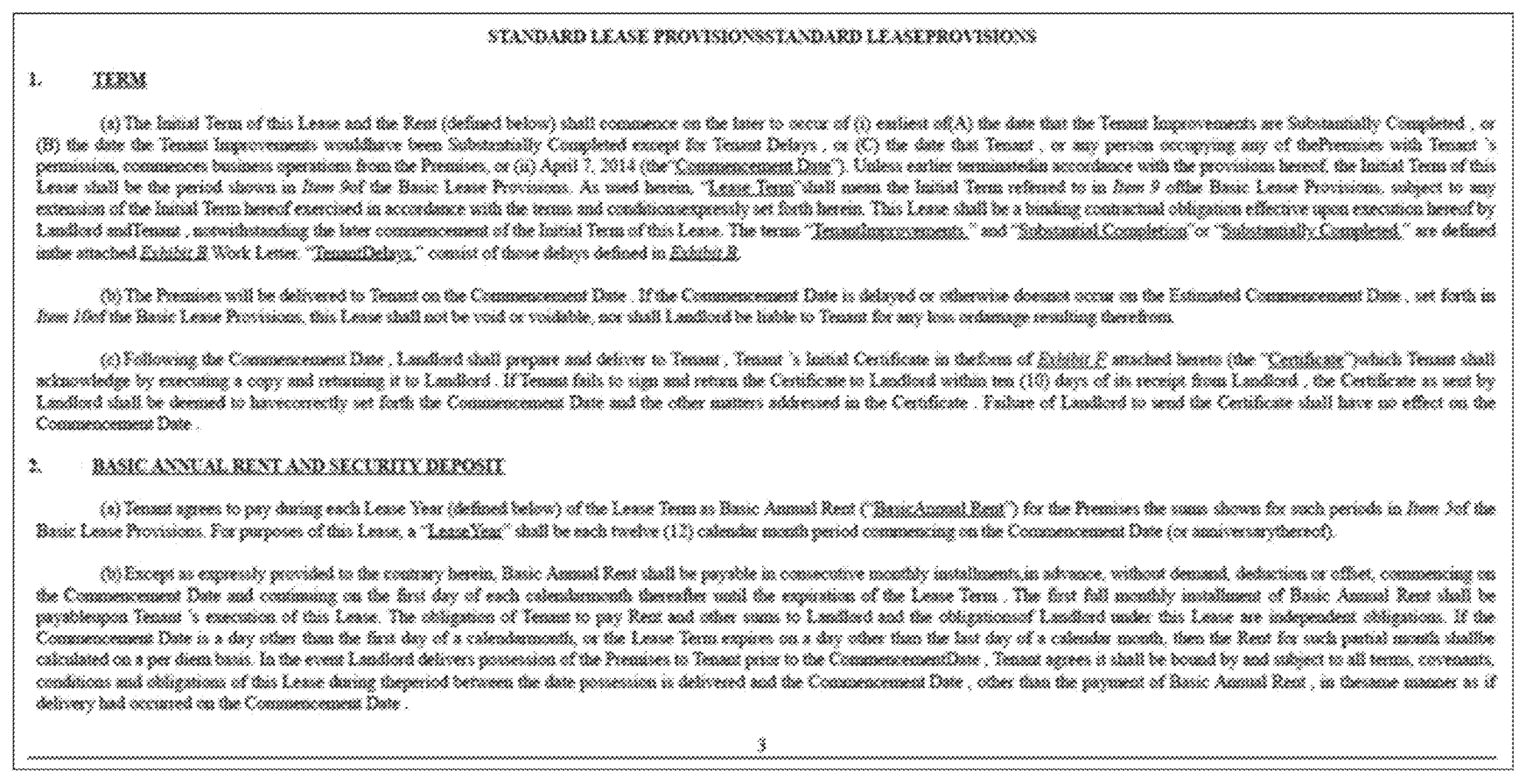

In another example, on another page of an exemplary document, shown in FIG. 11, there is another title "STANDARD LEASE PROVISIONS STANDARD LEASEPROVISIONS" which is likely at the "same level" as "BASIC LEASE PROVISIONS" from two pages prior (i.e. FIG. 10). In addition, we see other items like "1. TERM" which likely begins a clause and sub-items that begin with text like "(a)" or "(b)". This page also shows how simplistic approaches to identifying clauses will fail. For example, if one decided to look for "numbered items" as clause headings it would be easy to mis-identify the page number "3" as the third clause in this list of clauses.

As shown in these examples, real-world documents can contain many kinds of "three dimensional" information that is hard to interpret via a linear scan of the text. In describing this information as "three dimensional," this accounts for the two physical dimensions of the page plus the third dimension of text format, e.g. bold, underline, caps, font, etc. As humans, we can easily chunk this text because we see in two dimensions of the page and can easily distinguish the third format dimension. When processing the document as linear text, this three-dimensional structure needs to be recreated or inferred to properly extract structure. Finally, it is important to keep in mind that other documents will look very different from this one. Their sections may be identified with roman numerals or have negative left indentation, different fonts or styles. Their page numbers may be in the header instead of the footer and may contain other kinds of boilerplate, etc.

Hierarchical structure extraction is suitable not only for scanned documents but for natively electronic ones as well because hierarchical information may not be readily exportable from some formats, i.e. PDF, and/or a document may contain noise due to repeated editing. This last situation arises frequently in legal documents.

This work introduces the section hierarchy problem as the problem of identifying a documents' hierarchy of sections (including lists) and its boilerplate in the presence of noise. Unlike other structure extraction work, we are interested not only in the top-level sections of a document but in all of its hierarchical components including itemized lists. We are also specifically interested in working with large (50+ page) documents. We characterize the complexity of the section hierarchy problem as NP-hard and present a tractable solution. Our approach does not necessarily require the use of training data but instead attempts to identify the hierarchy of a document in a way that that optimizes a function of the coherence, or readability, of a document. This function is relatively computationally easy to construct and encodes knowledge about how an author creates documents in order to convey sectioning information to a reader. One key aspect of the authoring process relied on is that those section headings or boilerplate of a document that are logically connected are assumed to look the same.

Since we propose to handle as many different kinds of documents as possible, most of which we don't have examples for, we take the approach of designing an algorithm based on a generalized notion of how a document might be segmented by its creator. A key idea is that when a lawyer (or any user or creator for that matter) writes a document, she will likely make textual elements that should be grouped together look the same. So, for example, all top-level headings may likely look the same, e.g. use the same format and relative horizontal position. All clause titles may likely have a similar format such as "<number> Bold Title in Camel Case: First sentence of clause . . . " or "CENTERED TEXT IN ALL CAPS". Similarly, all sub-sections will likely look the same, e.g. "<roman numeral>—text goes here . . . " or "(<lowercase letter>)—text begins on next line".

Also, since, in particular, we are dealing with OCRed input, any solution is preferably resilient to errors. For example, text that is in bold or italics or underlining may be interpreted as plain or vice versa. Spaces may be missing and odd characters inserted at random, etc.

One approach may be to identify and extract possible titles or headers from a document and then to group them into sequences that belong together based on their "appearance" in the document. These titles or headers can then be merged into a hierarchy or structure, ones that have certain properties can be eliminated as boilerplate, and we can search the remaining sequences for the most "clause like". In a simple case, each title or heading in a "best" sequence is then used to delimit each clause while in a more complex case, sequences can be merged to produce a full hierarchy of titles, e.g. sections, clauses, sub-clauses, etc.

In one exemplary embodiment, text of a document is input in reading order and produces a tree-structured hierarchy of the document's text where each node of the tree represents a logical section of text. All potential sections are identified from top level sections with headings to bulleted list items. The present innovations are not restricted to a finite nesting depth. See FIG. 1(b) for example output. In addition, our algorithm may be configured to identify and remove "boilerplate" items like page headers, page footers, page numbers, etc. We do not necessarily assume access to page break information as this is not always available. The input text is preferably annotated with formatting and physical layout information, e.g. font size and vertical and horizontal indent. These annotations are used to identify section headings, list items and boilerplate.

Extracting a document's hierarchy can be a deceptively difficult problem for several reasons. The first is that documents, even natively electronic documents, may be corrupted by many sources of noise. These include:

(1) OCR errors: e.g. '1)' to '1)', 'Section III' to 'Sectiom MI' or 'Example' to '$cample';

(2) formatting and layout errors: these include errors in typography (font type, size, and emphasis, i.e. underline, bold, italic), character case and justification, i.e. center; and (3) user errors: these include formatting text that logically belongs together in different ways, e.g. "SECTION 2" and "Section III" or changing the order of items in a list, e.g. "1", "4", "2" instead of "1", "2", "3".

The effect of this noise is to render many downstream tasks much more difficult, specifically the task of identifying section boundaries. This is particularly important for our task as each node in the output tree may represent a section.

For the documents that may be a subject of the present innovations, a section may be identified as text between headings such as "Introduction" and "Related Work" or list items such as "a) the area . . . " and "b) notwithstanding . . . ". Many authors have documented the difficulty of section identification in real-world documents even in very specific domains. Therefore, any system that solves the section identification and hierarchy identification problems, such as the one embodied by the present innovations, will preferably be configured to deal with both false positives and false negatives in section and hierarchy identification. FIG. 1(a) shows a sequence of headings with the four kinds of errors outlined above highlighted. FIG. 1(b) shows an approach for identifying correct hierarchical structure.

Furthermore, the section hierarchy problem is complicated by the fact that logically related headings or boilerplate may appear very far from each other in a document with many different kinds of intervening headings. This is particularly true of headings towards the root of the hierarchy, but can also apply to deeper headings as demonstrated by the relationship between the headings at lines 7 and 11 of FIG. 1(b).

In one exemplary approach, we define a document $D=(c_1, \ldots, c_l)$ as an ordered list of l text chunks $c_i$ in reading order of the document. Each text chunk is endowed with a set of features $fc_i$ such as font size, emphasis and justification. The features of each text chunk are assumed to be corrupted by noise, e.g. a chunk that is actually underlined may instead be reported as italic. Some exemplary raw text features that may be used in this work are listed in Table 1. Furthermore, we do not assume the input contains page break markers which makes identifying boilerplate much more difficult.

TABLE 1

Text chunk features.

| Feature | Example Value |
| --- | --- |
| font family | Ariel |
| font size | 32 |
| italic | False |
| bold | True |
| underline | False |
| space above | 120 |
| space left | 50 |
| space left first line | 0 |
| justification | left |

Let a heading be any text chunk that is a section heading, boilerplate item or list item where a boilerplate item is a page header, page footer, page number or any similar kind of repeated text in a document. Let $H=\phi(D)=\{h_1, \ldots, h_n\}$ be those text chunks of D that are classified as headings by a binary classifier $\phi$. In real world documents, H may be corrupted by both false positives and false negatives.

Let any $Q \subseteq H$ be referred to as a sequence since Q is naturally fully ordered based on the reading order of the document. Our goal is to identify those sequences of H that the author intended to be considered as a coherent list of logically related sections.

For example, the headings "Article 1", "Article 2" and "Article 3" form a sequence of sections which are related and should appear at the same level in a document's hierarchy. Real world documents, however, contain many sequences which are not so easily identified as belonging together.

We introduce some notation to make working with sequences easier. Let a sequence $S=(s_1, \ldots, s_m)$ be represented as an ordered list of monotonically increasing indices into [1, n] such that $s_i \Leftrightarrow i<j$. Each sequence naturally represents an ordered list of headings $S=(h_{s_1}, \ldots, h_{s_m}) \subseteq H$. A sequence can also be interpreted graphically as a linear chain with m nodes and m−1 edges, $\langle s_i, s_{i+1} \rangle$ for $1 \le i < m$ where it is understood that such an edge is between nodes $s_i$ and $s_{i+1}$ (or equivalently between headings $h_{s_i}$ and $h_{s_{i+1}}$). A partition $P=(S_1, \ldots, S_k)$ of H is a family of subsets of H such that $S_i \cap S_j = \emptyset$ for $S_i, S_j \in P$ $i \ne j$ and $\cup_{S \in P} S = H$.

We show that finding a partition P of H where each sequence in P is maximally coherent is a solution to the section hierarchy problem.

The difficulty of partitioning H becomes evident when one considers that headings in a sequence may be very far apart in the original document. For example, consider a document with long multi-page sections at the top of its hierarchy where each section contains many sub-sections, lists and boilerplate. The headings of the top-level sections must be placed into the same sequence as opposed to sequences containing any intermediary headings. This is a difficult problem considering that the set of identified headings H is noisy (i.e. contains both false headings and is missing some true headings). Furthermore, comparing elements in H to determine if they belong in the same sequence is complicated by the fact that the features $f$ for each text chunk, from which the headings in H are derived, are also noisy. For example, some elements in H may have their text corrupted by OCR errors, their emphasis may be wrong or their text size may be inaccurate.

To find the best partition of H we define a coherence function $g(S): 2^H \mapsto \mathbb{R}$ which is assigns a positive value to any sequence in proportion to how logically consistent its elements are with each other. For example, for the two sequences A=("INTRODUCTION", "PROBLEM DEFINITION", "HISTORY") and B=("INTRODUCTION", "Orientation", "PROBLEM DEFINITION", "HISTORY") it should be the case that $g(A) > g(B)$ because the second title in A is more coherent with the other titles in A than the second title in B is with the other titles in B.

Nearly all of what constitutes an acceptable document structure can be encoded in g by ensuring that higher values are given to sequences whose headings are more heterogeneous with respect to their "look". The function g is relatively easy to construct for large classes of documents, as discussed in more detail below.

The coherence of a partition P can be represented as:

$$G(P) = \frac{1}{\Sigma_{S \in P} |S|} \sum_{S \in P} h(S)|S| \quad (1)$$

The present innovations focus on finding that partition which maximizes G over all possible partitions $\mathscr{P}_H$ of H:

$$P^* = \max_{P \in P_H} G(P) \quad (2)$$

The optimization problem described in equation (2) can be shown to be NP-hard using a simple reduction to the weighted set cover problem. The present innovations present a principled method to estimate a solution to (2) that runs in polynomial time and produces good results.

Before describing the solution, recall that a noncrossing partition P of H is a partition whose subsets don't overlap each other. Specifically, P is noncrossing if for any $S_1, S_2 \in P$ with $s_a < s_b < s_d$, $s_a, s_c \in S_1$ and $s_b, s_d \in S_2$ then $S_1 = S_2$. A noncrossing partition of H captures the notion that each section of a document is a contiguous portion of text that does not bisect any other section.

The proposed solution begins by identifying section headings H from the text of a document. A crossing partition of H is derived in polynomial time and is used to identify boilerplate sequences. This is because boilerplate sequences will normally cross/bisect other sequences, i.e. consider a sequence of page numbers. Once boilerplate sequences are removed, the remaining sequences are "shattered" to create a noncrossing partition of H whose coherence can be monotonically increased using search-based optimization techniques. A tree can be produced directly from the resulting noncrossing partition.

Figures 7, 8:
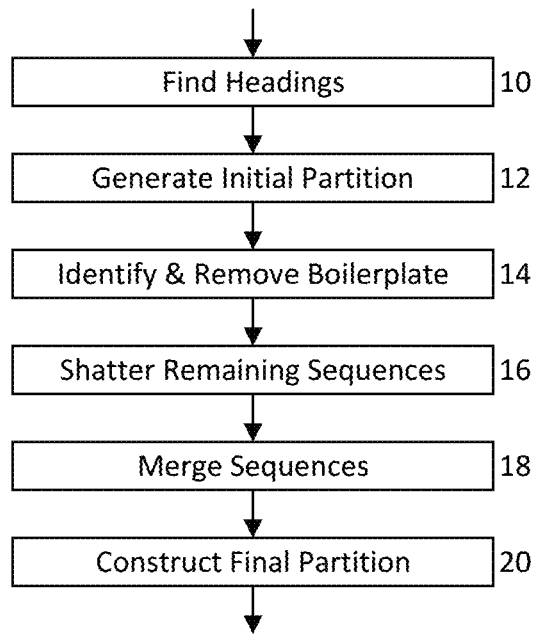
FIG. 7 depicts an exemplary algorithm to reconstruct a documents' tree according to one embodiment.
FIG. 8 depicts the steps of an exemplary structure extraction solution according to one embodiment.

The steps of an exemplary solution according to one embodiment are shown generally in FIG. 8. First, an input document is received and the headings H of the document are found 10, for example, by classifying each text chunk. Then, an initial partition S is generated 12 that approximates a solution to (2) using, for example, a polynomial time algorithm. Then, boilerplate sequences are identified and removed from S 14. Then, the remaining sequences are "shattered" 16 to form a set of noncrossing sequences P. Then, the remaining sequences are merged 18, for example, to incrementally improve the coherence G(P) by selectively merging its elements while ensuring P remains noncrossing. Then, the document's structure is constructed 20, for example, directly from the final partition.

In another exemplary embodiment, the steps of an exemplary solution may be simplified to finding the headings 10, identifying and removing boilerplate 14 and constructing final partitions and sequences of headings 20.

Heading classification is a non-trivial task and in fact our system is designed specifically because heading detection is expected to produce both type I and type II errors. In our system a heading can have up to four parts as exemplified in FIG. 2: prefix, mark, title and text.

A heading should preferably consist of at least a mark, e.g. "a)", or a title, e.g. "SUMMARY". We identify headings based on character patterns, layout and formatting information using a small number of regular expressions and some control logic. Formatting includes things like emphasis, e.g. bold, and character case. Layout includes left indent and justification. Importantly, we do not use word-based features or rules except for a small number of phrases used to reject a heading, e.g. "Signature:". This allows us to generalize the system to more domains quickly.

As outlined above, identifying a partition of H that maximizes the coherence of the document is NP-hard. This is because the domain of maximization in (2) is over all partitions of H which is necessary because g is computed using an entire sequence all at once. To overcome this problem, we propose to generate a candidate partition which maximizes the coherence of a partition over pairs of headings as opposed to over entire sequences of headings.

Let a problem graph G=(H, E) be a graph representation of a document where the vertices of the graph are the headings H and each edge $\langle h_i, h_j \rangle \in E$ represents that the pair of nodes $h_i$ and $h_j$ are in the same sequence. The edges of G are initially populated with all allowable associations: E={$\langle h_i, h_j \rangle$; i<j}. FIG. 3(a) depicts such a graph for a document with five headings. A path through the graph represents a sequence of headings. Since each node in the problem graph G participates in multiple paths, G does not represent a partition of H. For a graph to represent a partition, all paths in the graph should be vertex disjoint which can be expressed by the constraints:

$h^+ \leq 1 ; h \in H$ $h^- \leq 1 ; h \in H$ (3)

where $h^{+/-}$ are the out-degree/in-degree of the vertex h. Let $G_p=(H, E_p)$ be a partition graph of the problem graph G where $E_p \subset E$ and $G_p$ satisfies (3). FIG. 3(b) is a partition graph of the problem graph shown in FIG. 3(a) that consists of two paths/sequences.

Finding a partition graph is equivalent to finding a vertex disjoint path cover for G. We transform the problem graph G into a bipartite graph G' and apply a matching algorithm to identify the set of vertex disjoint paths/sequences.

Let G'=(L∪R, E') be constructed from G as follows: each vertex $h_i \in H$ is split into two vertexes $l_i \in L$ and $r_i \in R$ and each edge $\langle h_i, h_j \rangle \in E$ is added as $\langle l_i, r_j \rangle \in E'$. The graph G' is bipartite as all edges start with a vertex in L and end with a vertex in R. FIG. 4(a) depicts the bipartite representation of the problem graph in FIG. 3(a).

A matching in a bipartite graph is a set of edges that are vertex disjoint, i.e. each node in L is incident to at most one node in R and each node in R is incident to at most one node in L. A perfect matching is one in which all nodes are incident to one edge. If G is acyclic any matching in G' has a one-to-one correspondence with a vertex-disjoint path cover of G. Since the problem graph G is acyclic, finding a matching in G' will provide a vertex disjoint path cover in G and hence a partition of H.

The problem then is how to choose a matching between the nodes in L and R in G' that optimizes the coherence of the sequences represented by the resulting partition. A convenient choice is g itself but restricted to pairs of headings, i.e. sequences of length 2. Let each edge in G' be assigned a weight:

$$m_{i,j} = \begin{cases} g((h_i, h_j)) & \text{if } \langle l_i, r_j \rangle \in E' \\ -\infty & \text{otherwise} \end{cases}$$

The edges of G' are thus enhanced with a score indicating the similarity of each pair of headings. A matching of the nodes in G' that maximizes these weights would represent a partition P of H that maximizes the pairwise coherency between the elements of each sequence in P. In addition, since we expect each header to participate in a sequence, we add the additional constraint that all nodes should be matched. This is an instance of a maximum weight perfect matching problem which can be cast as a linear sum assignment problem (LSAP) for which there exist polynomial time solutions.

Let a square adjacency matrix be defined as:

$$X = x_{i,j} = \begin{cases} 1 & \text{if } l_i \text{ is to be assigned to } r_j \\ 0 & \text{(otherwise)} \end{cases}$$

Then a mathematical formulation of LSAP is:

$$\max \sum_i \sum_j x_{i,j} m_{i,j} \tag{4a}$$

$$s.t. \sum_i x_{i,j} = 1 (j = 1, ..., n)$$

$$\sum_j x_{i,j} = 1 (j = 1, ..., n) \tag{4b}$$

Figure 4B:
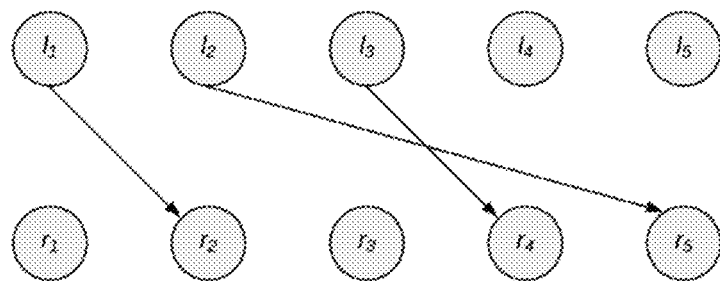
FIG. 4(b) depicts a matching in FIG. 4(a) that produces the partition graph shown in FIG. 3(b).

A solution to (4) provides an adjacency matrix X which indicates which edges are part of a perfect matching between L and R. A partition graph is easily constructed from X by keeping only those edges in E' with non-zero entries in X and merging nodes $l_i$ and r back into a single node $h_i$ and incorporating all incident edges of $l_i$ and r into $h_i$. FIG. 4(b) shows the matching that would produce the partition graph in FIG. 3(b) by this process.

The partition graph in turn directly represents a partition $S=(S_1, \ldots, S_k)$ of H into k sets. Each subset $S_i = (h_{s_{i,1}}, \ldots, h_{s_{i,m}})$ of S in turn represents a sequence.

In another exemplary embodiment, the titles in a document are represented in a totally ordered sequence as $T=(t_1, t_n)$, i.e. title $t_i$ appears before $t_j$ iff i<j. Let $m_{i,j}:=m(i,j)$ be a similarity measure between titles $t_i$ and $t_j$. Higher scores indicate the titles are more similar. The similarity between two titles will depend on things like their font style, indentation, format, marks, etc. as discussed elsewhere herein. The similarity score is not, however, based on a language model but more on typography (the way text "looks"), orthography (the way the text is spelled, e.g. all uppercase) and page layout (e.g. space between text). The "content" of each title is for the most part ignored to make the solution as general as possible.

For example, consider these five titles:
1: "Clause 1. USE"
2: "Clause 2: INDEMNITY"
3: "Exercise 3: Solutions"
4: "page 3:"
5: "Clause 3: RelEASE"

We expect $m_{1,2} > m_{1,3}$, $m_{2,3} < m_{2,5}$, $m_{2,4} < m_{2,5}$ and $m_{1,2} > m_{1,5}$.

Our goal is to group titles into related sequences using only values of m and so avoid defining any thresholds that might be needed for example when using a supervised learning approach. For example, all "Clause" titles in the above list should be in the same sequence whereas titles 3 and 4 should be in other sequences or in their own sequence. We will call the set of extracted sequences a "sequence pool" so that it is easier to identify this concept.

The set of titles and similarity metrics can be visualized as a graph where each node is a title, there are edges between each node $t_i$ and each node $t_j$ where j>1 and where the weight on edge (l, j)=$m_{i,j}$. Alternatively, this can be viewed as an upper triangular matrix M of similarity values where the entry at row i and column j is $m_{i,j}$.

Grouping titles into groups of distinct sequences means that for each title $t_i$ we need to determine the most likely subsequent title $s(t_i):=s_i$. For example, in the above list of titles s(1)=2, s(2)=5, s(3)=None and s(4)=None. Furthermore, given these values for s( ) we can extract one sequence from these 5 titles, specifically [1, 2, 5].

One way to grow sequences from T would be a greedy approach where we first order the set U={$m_{i,j}$: 1<=i,j<=n} by decreasing value and define the function s as follows:
1. While U is not empty:
 a. Pop $m_{i,j}$ off the front of U where $m_{i,j}$ is max value in U
 b. If s(i) is defined, continue
 c. Set s(i)=j
2. Use s( ) to create the sequence pool Such approaches can run into difficulties because of their greedy nature and can be susceptible to small changes in how m( ) is calculated and/or errors from OCR. Consider the configuration of titles from a real document as shown in FIG. 12.

Figure 12:
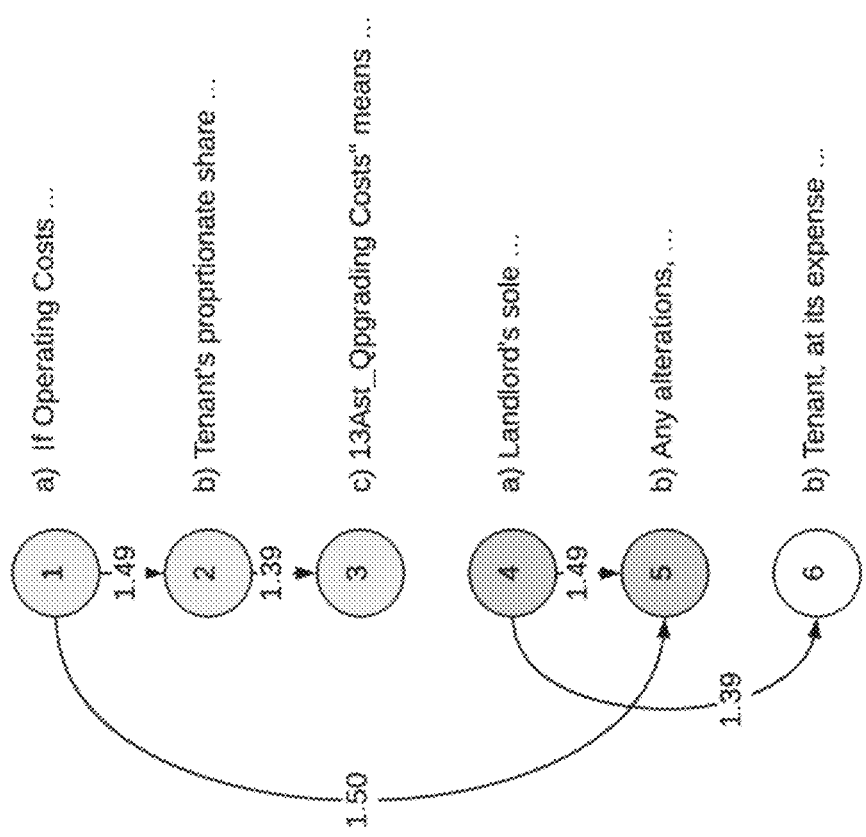
FIG. 12 depicts exemplary analysis of document headings.

In the example shown in FIG. 12, each node represents a title which appears to the right and is numbered for reference. The links are detected similarities between nodes and are marked with their m( ) values. Various heuristics have been employed to eliminate nodes that should not have links between them. For example, node 2 is not connected to node 4 because an intervening node (node 3) looks similar to node 4 and has a sequence mark, i.e. "c", that is lexicographically after that of node 5, i.e. "a", which implies they are likely part of a different sequence. Such heuristics seem to work well, however, we wish to design an algorithm that is robust to them not being perfect. Also note that nodes that are colored the same belong to the same sequence as per the original document.

In this case we see that m(1,5)=1.50 which is greater than m(1, 2) even though title 2 is the correct subsequent title for title 1. The value of m(1,5) is slightly greater than m(1,2) because of small errors in the similarity metric due to OCR errors not visible here. Instead of getting stuck in the "rabbit hole" of continually trying to improve m( ) for every exception discovered, we wish to devise an algorithm that will still work even when m( ) produces such "errors."

The correct solution consists of two sequences: ([1, 2, 3], [4, 5]). The greedy solution would produce ([1, 5], [2, 3], [4, 6]). Using m( ) as a rough measure of quality, we see that the sum of m( ) values for the correct set of sequences is m(1,2)+m(2,3)+m(4,5)=4.37 while that for the greedy solution is m(1,5)+m(2, 3)+m(4, 6)=4.28.

We implement techniques from combinatorial optimization to solve this problem by refactoring the graph representation of our problem as depicted in FIG. 12 into a bipartite graph. Recall a bipartite graph is one which consists of a set of left nodes (L) and a set of right nodes (R). Furthermore, each edge (X, Y) must have its head node X∈L and its tail node Y∈R. A "matching" M is a subset of edges in the graph such that each node in L appears only once in the set of head nodes of M and each node in R appears only once in the set of tail nodes of M. That is, no two edges in M share a node in L or a node in R. If we consider the weight on each edge (X, Y) as being the value of m(X, Y) then the problem is to find a matching that maximizes the cumulative sum of the weights of the edges in the matching. This optimization problem is a member of the set of matching problems. In order to make use of the rich set of solutions to matching problems, we'll transform our problem into specific kind of matching problem called a linear sum assignment problem (LSAP).

Figure 13:
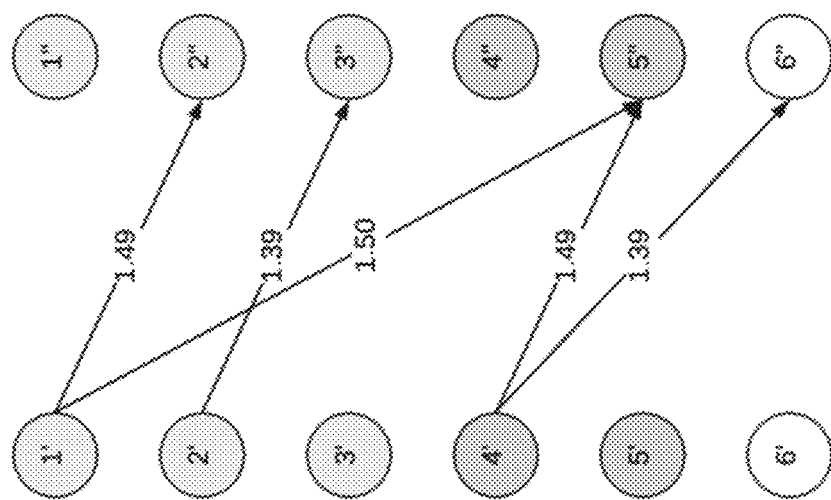
FIG. 13 depicts a bipartite analysis of the headings depicted in FIG. 12.

Let G=(T, E) be a graph representing our problem as in FIG. 12. Specifically, T is the set of titles we've extracted from the document and E is the set of edges between titles where each edge (X=$t_i$, Y=$t_j$) has the weight m($t_i$, $t_j$). To transform G into a bipartite graph G'=({L∪R}, E') we split each node X∈T into two nodes X' and X" where X'∈L and X"∈R. For each edge (X, Y) in the original graph we add an edge (X', Y") to E'. Furthermore, for every edge (P, Q) not in E, we add a zero weight edge to E' so that the resulting graph is a complete bipartite graph. FIG. 13 depicts the graph in FIG. 12 after this transformation but excludes all the zero weight edges for clarity.

We wish to find a matching between the nodes in L and those in R that maximizes the sum of the weights of the edges in the matching. This is a LSAP for which multiple polynomial time algorithms exist. This can be represented mathematically as follows. First the solution is represented by a matrix X:

$$x_{i,j} = \begin{cases} 1 & \text{if there is an edge from } t_i \text{ to } t_j \\ 0 & \text{otherwise} \end{cases}$$

Let M be the matrix of similarity measures between each node in G' such that $m_{i,j}$=m($t_i$, $t_j$) if edge ($t_i$, $t_j$)∈E' and 0 otherwise. The problem can then be expressed as:

$$\max \sum_i \sum_j m_{i,j} x_{i,j}$$

Such that:

$$\sum_i x_{i,j=1}$$

$$\sum_j x_{i,j} = 1$$

$$x_{i,j} \in \{0, 1\}$$

The two constraints ensure that each node in L is connected to exactly one node in R and each node in R is connected to only one node in L.

Given a solution X* to this problem we can extract a set of title sequences by noting that title $t_i$ is followed by title $t_j$ in some sequence iff $x_{i,j}=1$, i<j and m(ij)>0. By repeatedly starting with the first index that is not already part of a sequence until no more indexes are available we end up with a set of title sequences $S=(S_j, \ldots S_m)$.

With an initial partitioning and sequencing of the document titles or headers completed, boilerplate is identified and removed. This step may also be completed before initial partitioning and sequencing in some embodiments.

The boilerplate sequences in S are those that consist of things like headers, footers or page numbers. These can be identified by their regularity, that is, the text of the headings in a boilerplate sequence differ from each other only by a small amount. Let $d(h_i, h_j)$ be the Levenshtein distance between the text of two headings. See (V. I. Levenshtein. [n.d.]. Binary Codes Capable of Correcting Deletions, Insertions and Reversals. 10 ([n. d.]), 707), which is incorporated by reference herein in its entirety.

For example, in one embodiment, to determine which sequence in S is the true set of "clauses" of a document, we use a set of heuristics. First, we eliminate from S any sequence S for which any of the following are true:
1. Then average length of the titles in S<5
2. The average Levenshtein distance between subsequent titles is less than 20% of the average length of each title.

The first item can eliminate sequences of things like simple page numbers. The second item eliminates other kinds of boilerplate that contain a lot of repeated text. Recall that the Levenshtein distance between two strings A and B is the number of edits (insertions, deletions or substitutions) that are needed to transform A into B and can be quickly computed using dynamic programming techniques. It is a good proxy for a measure of the similarity between two strings. For example, the Levenshtein distance between two strings like "Appendix 4" and "Appendix 5" will be relatively low since each title contains a kind of boilerplate string, e.g. "Appendix". In contrast, the Levenshtein distance between two strings like "Permitted Use" and "Environmental Requirements" are much higher. This is consistent with our intuition that clause titles should convey a lot of information, i.e. they should be quite different from each other.

In another embodiment, a sequence is determined to be boilerplate if its elements cluster into a single group using any suitable clustering algorithm and threshold parameter. We used the DBSCAN algorithm with a value of 3 for both the epsilon and min points parameters. See (Martin Ester, Hans-Peter Kriegel, and Xiaowei Xu. [n.d.]. A Density-Based Algorithm for Discovering Clusters in Large Spatial Databases with Noise. In KDD Proceedings (1996). AAAI, 6.), which is incorporated by reference herein in its entirety. We exclude from consideration sequences that contain special domain specific words such as "Article" or "Appendix". This is the only other domain specific knowledge used besides the definition of g.

With boilerplate removed, the final sequencing and partitioning of the remaining header or title sequences may begin. For the remainder of the proposed solution it may be assumed that boilerplate sequences have been removed from S.

In one embodiment, sequences may be further limited according to a set of heuristics intended to isolate those sequences of the document that represent the substantive content of the document—"the clauses." For example, the sequence or set of sequences that have the highest value of h( ) may be chosen as a set of "clauses" where h is defined as:

$$h(S_i) = a_1 \frac{c(S_i)}{N} + a_2 \sum_{j=1}^{|S_i|-1} m(t_j t_{j+1}) a_3 \frac{1}{\log\left(\frac{1}{|S_i|} \sum_{j=1}^{|S_i|} |t_j|\right)}$$

where $c(S_i)$ is the number of characters of the original document covered by the titles and their corresponding textual sections in the sequence $S_i$, N is the total number of characters in the document, $|S_i|$ is the total number of titles in a sequence and are the number of characters in the title $t_j$. The three parts of this heuristic can be interpreted as: (for the $a_1$ term) the percentage of the document covered by the titles in Si, (for the $a_2$ term) the mean strength of the similarity between titles in $S_i$, and (for the $a_3$ term) a discount for sequences with very long titles. Values for the weights $a_{\{1,2,3\}}$ may be manually set or may be set via a learned model. Exemplary weights for $a_{\{1,2,3\}}$ could be, for example, 0.2, 0.7 and 0.1 respectively.

The solution to the LSAP (4), referenced above, introduces two problems into S. The first is that because it implements a perfect matching it encourages sub-sequences to be merged with their parent sequences and adjacent sequences to be appended. As an example of the former problem, consider the following set of headings which are presented in their correct hierarchical relationship with line numbers to their left and the value of $m_{i,i+1}$ to their right:

| 1 | a) Governance: . . . | 0.99 |
|---|---|---|
| 2 | b) Issuance Constraints: . . . | 0.98 |
| 3 | c) Relationship to Owner: . . . | 0.89 |
| 4 | i) not related under . . . | 0.97 |
| 5 | ii) provided that . . . | 0.88 |
| 6 | d) Relationship to Seller: . . . | |

Using line numbers, the correct partition of these headings should be into two sequences: (1, 2, 3, 6) and (4, 5). The solution of (4), however, will be the single sequence (1, 2, 3, 4, 5, 6) because it includes 5 edges whose weights add up to be greater than the four edges of the correct solution. That is, even though $m_{3,6} > m_{3,4}$ and $m_{3,6} > m_{5,6}$ because of the mismatch in sequence marks (e.g. "d" is more likely to follow "c" than "ii" in a numbered list) it is likely that $m_{3,4} + m_{5,6} > m_{3,6}$. Again, this is a consequence of deriving a perfect matching.

To remedy this problem we cut sequences at edges of reduced similarity. For a sequence S, the values $S_m = (m_{i,i+1}:0<i<|S|)$ can be considered as a discrete time-varying signal. The "edges" in this sequence will identify sub-sequences boundaries. A common approach to detecting edges in a function $f(t)$ corrupted by noise is to search for the zero crossings of its second derivative $f''(t)=0$ after first smoothing the data. For discrete functions that are corrupted by noise, as is the case of $S_m$, this can be accomplished by convolving the signal with a smoothing kernel and one that numerically approximates the second derivative. Since edges in our case have zero width and manifest between adjacent sample points the support for the kernels should be very small. An exemplary kernel used for smoothing is $K_S=[0.15, 0.7, 0.15]$ and to numerically approximate the second derivative an example is $K_D=[1, -2, 1]$. Sequence are cut at zero crossings of $K_D \odot K_S \odot S_m$ and the sub-sequences added back to S where $\odot$ is the convolution operator.

In addition, those sub-sequences that have marks which form runs of roman numerals are identified, cut and the pieces added back to S. This is an example of how the interpretation of the hierarchical position of a heading depends on the other elements in its sequence.

Figures 5A, 5B:
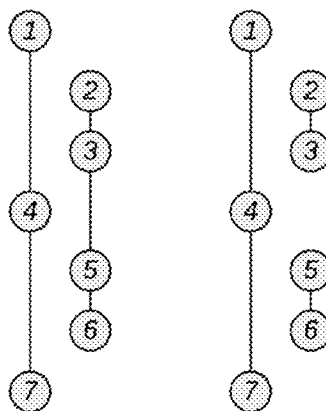
FIG. 5(a) depicts a pair of inconsistent sequences whose nodes are in document order.
FIG. 5(b) depicts a consistent set of three sequences after splitting the rightmost one shown in FIG. 5(a).

Finally, all crossing sequences in S are cut so that the resulting set of sequences are noncrossing. FIG. 5(a) shows two crossing sequences that are split into three noncrossing ones in FIG. 5(b). Edge $\langle 3, 5 \rangle$ overlaps edges $\langle 1, 4 \rangle$ and $\langle 4, 7 \rangle$. Either $\langle 3, 5 \rangle$ must be cut or both edges $\langle 1, 4 \rangle$ and $\langle 4, 7 \rangle$ must be cut to create a set of noncrossing sequences. Given two crossing sequences $S_a$ and $S_b$ as in FIG. 5(a), let $S_{a/b}$ represent the resulting set of three sequences where $S_b$ has been cut into two segments in favor of keeping $S_a$ whole. Which sequence to cut depends on the coherence of the resulting sequences:

$$\text{if } G(S_{a/b}) > G(S_{b/a}) \text{ cut } S_b \text{ otherwise cut } S_a \quad (5)$$

"Shattering" the whole partition S is done greedily by cutting one of each pair of crossing sequences and updating S with the results of the cut. Let P be the resulting set of noncrossing sequences.

Some valid sequences in S may, however, have been cut when the set was shattered. In this stage, we merge sequences in P that increase global coherence while maintaining the set as noncrossing. The candidates for merging are those sequences which lie between edges in P. A sequence S is directly covered by an edge $\langle j, k \rangle$ if the indices of its headings lie between j and k and there is no other edge $\langle i, m \rangle$ in any sequence of P that also covers S such that $j \ll m \ll k$. Let $P\langle j, k \rangle$ be the set of sequences that are directly covered by the edge $\langle j, k \rangle$ in P.

As before, we will partition $P\langle I, k \rangle$ into subsets which maximize the total coherence of the sequences represented by each subset. In this case, however, we will consider only non-crossing partitions and the elements are not headings but sequences (although they may be sequences of length 1).

If $\mathscr{C}_P$ is the set of all noncrossing partitions of P let $P^*\langle j,k \rangle$ be the set of sequences which maximizes total coherence:

$$P^*_{\langle j,k \rangle} = \max_{P \in \mathscr{C}_{P_{\langle j,k \rangle}}} G(P) \quad (6)$$

The size of the domain needed to be searched in (6) is much smaller than that in (2) not only because $|P\langle j, k \rangle| < |H|$ but also because the number of noncrossing partitions of a set is much smaller than the number of partitions of that set. This makes solving (6) using a beam search feasible.

The size of $\mathscr{C}_P$ is given by the Catalan number:

$$C_n = \frac{1}{(n+1)} \binom{2n}{n}$$

where $n=|P|$ and the size of $\mathscr{P}_H$ in (2) is given by the Bell number:

$$B_n = \sum_{k=0}^{n} \begin{Bmatrix} n \\ k \end{Bmatrix} = \sum_{k=0}^{n} \frac{1}{k!} \sum_{k=0}^{n} (-1)^i \binom{k}{i}(k-1)^n$$

where $n=|H|$ and $$\begin{Bmatrix} n \\ k \end{Bmatrix}$$

is the Stirling number of the second kind.

Since $B_n$ grows much faster than $C_n$ and $\Sigma_j \langle j,k \rangle_{\in P} |P\langle j,k \rangle| = |P|$ we have $$\mathbb{E}_{|P_{\langle j,k \rangle}| < |P| < |H|}$$

which implies:

$$\sum_{\langle j,k \rangle \in P} |\zeta_{P_{\langle j,k \rangle}}| \ll |P_H|$$

We can therefore feasibly enumerate the most viable candidates in $\mathscr{C}_{P_{\langle j,k \rangle}}$ using a beam search where we keep only a constant number of the top noncrossing partitions by coherence value. A maximum beam of just 50 candidates was enough to ensure optimal performance for the documents in our test set. For each edge $\langle j, k \rangle \in P$ the elements of $P\langle j,k \rangle$ are replaced with $P^*_{\langle j,k \rangle}$. It is easy to see that each such update of P does not decrease G(P) and maintains it as a noncrossing set. Finally, to ensure any top level sequences are properly merged, a virtual edge which spans the entire document is included in P.

The hierarchical structure of the document can be easily constructed from P by setting the depth and parent of each heading in P. For example, the algorithm shown in FIG. 7 shows an algorithm to reconstruct a document's tree by calling rec_edge(root, -1, v, P) where root is a virtual or artificial root or root node and v is a virtual edge that spans or covers the entire document.

The coherence function g assigns higher values to sequences which are more coherent, or consistent with themselves. Its definition is the core of the proposed system and the only thing the user needs to define besides a heading classifier and some constants to aid in boilerplate classification. The fewer features used in its definition the more generalizable the system is at the expense of accuracy. In our case, we did not use any word-based features but only layout, formatting (typography) and case. In all, 17 features were used which fall into the four main classes listed in Table 2.

TABLE 2

Features used to compute g.

| Feature Class | Example |
| --- | --- |
| consistency of marks | all marks are derived from the same template |
| sequencing of marks | all marks are in sequence |
| consistency of formatting | all titles are all uppercase and have same font size |
| consistency of layout | all headings have the same left indent |

Since all features will be corrupted by noise it is important that g vary smoothly with changes in its inputs and produce its lowest value when the features for a sequence are most inconsistent with each other. If there are k features then:

$$g(S) = 1 - \frac{1}{k}\sum_i H(f_i(S))$$

where $f_i(S)$ are the values of feature i for sequence S and H is the entropy function.

The algorithm was evaluated on a test set T of 35 randomly selected documents that were originally part of publicly available financial disclosure documents filed with the SEC. These documents had been digitally scanned and their text extracted using OCR technology. In addition, they had been processed through a complex pipeline of transformations, many of which have introduced small but significant errors in the format and/or text of the document. The headings of each document were classified by hand into one of 14 classes. These consisted of TitlePage, TableOfContents, Heading-X, ListItem-X and Other where X can be 1 through 5 indicating the depth of the heading or list-item. All boilerplate is classified as Other. Table of Contents headings are ignored from both the test documents and our algorithm output.

Our primary performance metric is how well our algorithm re-constructs the tree of the original document whereas less emphasis has been placed on detecting section headings. This is because identified headings will always contain errors and a focus of this work is to reconstruct a document's hierarchy in the presence of such errors. The F1 score for heading classification is 0.89 with more details given in Table 3.

TABLE 3

Performance metrics for heading classification and PC score. Standard deviations are in parenthesis.

| Performance Metric | F1 | Precision | Recall |
| --- | --- | --- | --- |
| heading classification | 0.89 | 0.82 (0.10) | 0.98 (0.04) |
| PC score | 0.84 | 0.86 (0.12) | 0.82 (0.13) |
| boilerplate identification | 0.45 | 0.45 (0.45) | 0.46 (0.44) |

Figures 6A, 6B:
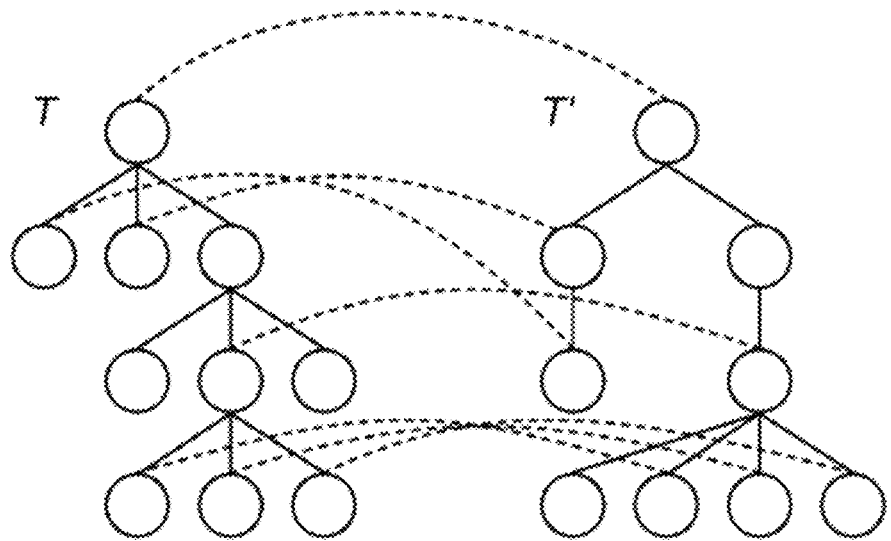
FIG. 6(a) depicts a ground truth tree.
FIG. 6(b) depicts a tree constructed from the present innovations wherein the matched nodes are indicated with dotted arcs.
Figures 6C, 6D:
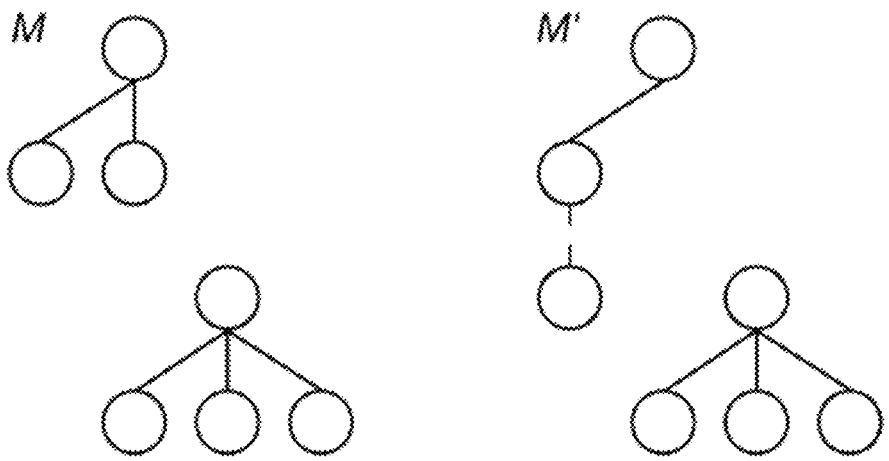
FIG. 6(c) depicts the tree in FIG. 6(a) restricted to the matched nodes, with a PC precision/recall value of 4/5=0.80.
FIG. 6(d) depicts the tree in FIG. 6(b) restricted to the matched nodes, with the dashed arc indicating an edge with no correspondence in the ground truth graph M' and with a PC precision/recall value of 4/9=0.44.

The quality of a document's reconstructed hierarchy is determined by comparing each ground truth tree T from the test set with the one from our algorithm T'. In order to separate the performance measurement of heading identification from hierarchy reconstruction, we compare the versions of T and T' that have been restricted to those nodes that are common between them. In this way, we measure how well the algorithm reconstructed the document's hierarchy independently of how well it has identified headings. Denote these restricted trees as M and M' as depicted in FIG. 6. Furthermore, let the nodes common to T and T' be given the same name in M and M' and all other nodes be given unique names. This allows us to uniquely identify each edge by an ordered pair of its parent and child names. If $T_E$ represents the set of edges in a tree T we define the precision and recall of a parent/child (PC) score as the macro averaged precision and recall of each document in the test set:

$$precision = \frac{1}{|T|}\sum_{T \in \mathcal{T}} \frac{|M \cap M'|}{|M'|}$$

$$recall = \frac{1}{|T|}\sum_{T \in \mathcal{T}} \frac{|M \cap M'|}{|T|}$$

Table 3 lists the PC score for the test set.

Finally, the ability to identify boilerplate is determined by the macro-averaged precision and recall of the Other headings classified as boilerplate by the algorithm and which are also reported in Table 3.

The systems and methods described herein may be embodied in a standalone system, a system accessible by other systems or any combination. For example, in a standalone system embodiment, the structure and header extraction tools may be comprised in a standalone application residing on a user's computing device or accessed vie a network or internet link from the user's device. Such a standalone application may be configured to obtain standard documents such as standard playbooks or standard contracts from a contract analytics tool or other library through a web, network and/or API link, for example. Such an application may be configured to create user dashboards, visualizations and detection result exports. Such an application may be configured to interact with another application configured to perform any of the steps described herein.

The systems and methods described herein may also be embodied in a structure and/or header extraction service accessible to other applications via a web, network or API link. For example, a contract evaluation tool may be configured to access a structure and/or header extraction service independently via an API.

FIGS. 1(a) through 13 are conceptual illustrations allowing for an explanation of the present disclosure. It should be understood that various aspects of the embodiments of the present disclosure could be implemented in hardware, firmware, software, or combinations thereof. In such embodiments, the various components and/or steps would be implemented in hardware, firmware, and/or software to perform the functions of the present disclosure. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the disclosure as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present disclosure to a single embodiment, as other embodiments are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an embodiment showing a singular component should not necessarily be limited to other embodiments including a plurality of the same component, and vice-versa, unless explicitly stated otherwise herein. Moreover, the applicant does not intend for any term in the specification or claims to be ascribed an uncommon or special meaning unless explicitly set forth as such. Further, the present disclosure encompasses present and future known equivalents to the known components referred to herein by way of illustration.

The foregoing description of the specific embodiments so fully reveals the general nature of the disclosure that others can, by applying knowledge within the skill of the relevant art(s), readily modify and/or adapt for various applications such specific embodiments, without undue experimentation, without departing from the general concept of the present disclosure. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

In order to address various issues and advance the art, the entirety of this application for SYSTEMS AND METHODS FOR STRUCTURE AND HEADER EXTRACTION (including the Cover Page, Title, Abstract, Headings, Cross-Reference to Related Application, Background, Brief Summary, Brief Description of the Drawings, Detailed Description, Claims, Figures, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of an individual and/or enterprise user, database configuration and/or relational model, data type, data transmission and/or network framework, syntax structure, and/or the like, various embodiments may be implemented that enable a great deal of flexibility and customization. While various embodiments and discussions have included reference to applications in the legal context, and more specifically in the context of contract review, it is to be understood that the embodiments described herein may be readily configured and/or customized for a wide variety of other applications and/or implementations.

What is claimed is:

1. A method for extracting structure among headers, comprising:
    receiving a plurality of headers configured as a sequence of headers included in a document;
    identifying a set of features for respective headers from the plurality of headers, wherein the set of features include at least (i) an orthography feature related to orthography characteristics for the respective headers and (ii) two or more typography features related to typography characteristics for the respective headers, wherein the orthography feature is determined based on capitalization formatting for a string of characters in a data chunk that corresponds to a respective header included in the document, and wherein the two or more typography features comprise at least (a) a first typography feature configured with a first binary value or a second binary value based on a font setting for at least one character in the data chunk and (b) a second typography feature configured based on a page layout setting for the document;
    generating a first graph representation of the plurality of headers based at least in part on the orthography feature and the two or more typography features for the respective headers, wherein respective vertices of the first graph representation correspond to the respective headers;

determining a similarity between pairs of headers from the plurality of headers based on respective orthography features and respective typography features from the set of set of typography features;

transforming the first graph representation of the plurality of headers into a second graph representation of the plurality of headers that segments the headers into groups of one or more similar adjacent headers based on orthography similarities and typography similarities between adjacent headers in the sequence of headers; and matching non-adjacent groups of similar adjacent headers based on the groups of the one or more similar adjacent headers associated with the second graph representation of the plurality of headers.

2. The method of claim 1, wherein the matching of non-adjacent groups of similar adjacent headers is based on similarities between last headers in one group and first headers in another group.

3. The method of claim 1, wherein the headers are segmented into the groups of the one or more similar adjacent headers based on zero crossings of a second derivative of adjacent heading similarities along the sequence of headers.

4. The method of claim 3, wherein the adjacent heading similarities are smoothed before the second derivative is performed.

5. The method of claim 4, wherein the smoothing includes convolution with a smoothing kernel.

6. The method of claim 1, further comprising cutting any headers that cross one another, resulting in only non-crossing headers.

7. The method of claim 1, wherein the matched non-adjacent groups of similar adjacent headers form sequences and the matching includes maximizing a document-wide sum of similarities between adjacent headers within each sequence.

8. The method of claim 1, wherein the two or more typography features include a third typography feature configured with a non-binary value based on the font setting for the at least one character in the data chunk.

9. The method of claim 8, wherein the set of features include at least two or more of font family, font size, italic, bold, underline, space above, space left, space left first line, and justification.

10. The method of claim 1, wherein determining the similarity between the pairs of headers includes comparing marks of the headers.

11. The method of claim 1, wherein determining the similarity between the pairs of headers includes determining whether marks of the headers are derived from a same template.

12. The method of claim 1, wherein determining the similarity between the pairs of headers includes determining whether marks of the headers are in sequence from a first header that is first in the sequence of headers to a second header that is later in the sequence of headers.

13. The method of claim 1, wherein a path through the first graph representation of the plurality of headers represents to the sequence of headers included in the document.

14. The method of claim 1, wherein the first graph representation is configured as a tree-structured hierarchy of the plurality of headers included in the document.

15. A method for extracting structure among headers, comprising:

receiving a plurality of headers configured as a sequence of headers included in a document;

identifying a set of features for respective headers from the plurality of headers, wherein the set of features comprise at least (i) an orthography feature related to orthography characteristics for the respective headers and (ii) two or more typography features related to typography characteristics for the respective headers, wherein the orthography feature is determined based on capitalization formatting for a string of characters in a data chunk that corresponds to a respective header included in the document, and wherein the two or more typography features comprise at least (a) a first typography feature configured with a first binary value or a second binary value based on a font setting for at least one character in the data chunk and (b) a second typography feature configured based on a page layout setting for the document;

generating a first graph representation of the plurality of headers based at least in part on the orthography feature and the two or more typography features for the respective headers, wherein respective vertices of the first graph representation correspond to the respective headers;

determining a similarity between pairs of headers from the plurality of headers based on respective orthography features and respective typography features from the set of set of typography features;

transforming the first graph representation of the plurality of headers into a second graph representation of the plurality of headers that segments the headers into groups of one or more similar adjacent headers based on orthography similarities and typography similarities between adjacent headers in the sequence of headers; and sequencing the headers into one or more sequences based on the second graph representation of the plurality of headers and by maximizing a document-wide sum of similarities between adjacent headers within each sequence.

16. The method of claim 15, wherein the two or more typography features include a third typography feature configured with a non-binary value based on the font setting for the at least one character in the data chunk.

17. The method of claim 15, wherein determining the similarity between the pairs of headers includes determining whether marks of the headers are derived from a same template.

18. The method of claim 15, wherein determining the similarity between the pairs of headers includes determining whether marks of the headers are in sequence from a first header that is first in the sequence of headers to a second header that is later in the sequence of headers.

19. The method of claim 15, wherein a path through the first graph representation of the plurality of headers represents to the sequence of headers included in the document.

20. The method of claim 15, wherein the first graph representation is configured as a tree-structured hierarchy of the plurality of headers included in the document.

\* \* \* \* \*